Nov. 17, 1953  E. H. YONKERS, JR  2,659,840
STREET LIGHTING CONTROL UNIT
Filed Aug. 3, 1950  2 Sheets-Sheet 1

INVENTOR.
Edward H. Yonkers, Jr.
BY
Mason, Kolehmainen,
Rathburn & Wyss
Att'ys

Nov. 17, 1953
E. H. YONKERS, JR
2,659,840
STREET LIGHTING CONTROL UNIT
Filed Aug. 3, 1950
2 Sheets-Sheet 2
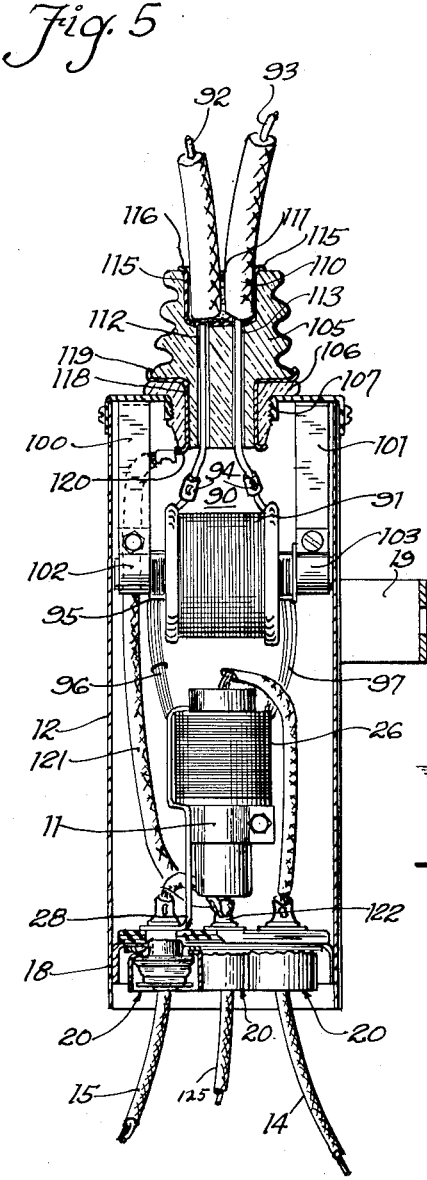
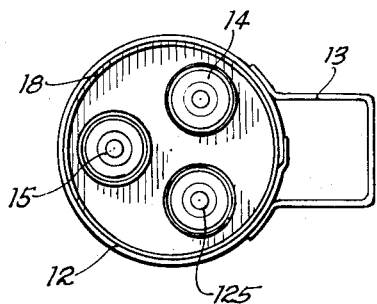
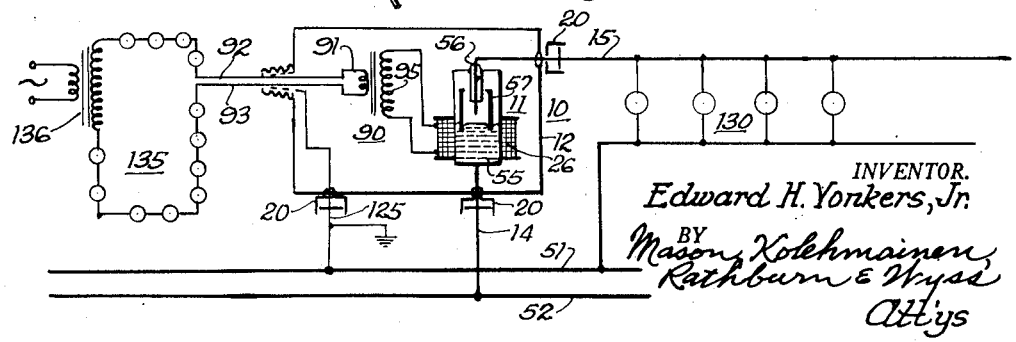
INVENTOR.
Edward H. Yonkers, Jr.
BY Mason, Kolehmainen,
Rathburn & Wyss
Att'ys Patented Nov. 17, 1953

2,659,840

UNITED STATES PATENT OFFICE 2,659,840

STREET LIGHTING CONTROL UNIT

Edward H. Yonkers, Jr., Glencoe, Ill., assignor to Joslyn Mfg. & Supply Co., Chicago, Ill., a corporation of Illinois Application August 3, 1950, Serial No. 177,487

6 Claims. (Cl. 315—161)

The present invention relates to street lighting control units, and, more particularly, to control units suitable for use in street lighting equipment to control remotely one or more lamps on a low voltage, multiple street lighting circuit. It is a primary object of the invention to provide a control unit of this type which is characterized particularly by its simplicity of construction, low cost, dependability of operation and efficiency.

It is another object of the present invention to provide a control unit of the above type in which novel means associated with the incoming leads of the unit are employed to protect the unit from voltage surges on the incoming leads.

It is a further object of the present invention to provide a remote control unit having a generally improved construction and design with particular relation to the protection of the unit against line surges and to the interconnection of these units to prevent damage to a series of such units.

It is another object of the present invention to provide a street lighting control unit wherein the remotely controlled operating unit is encased to provide positive and permanent protection from all effects of weather.

The invention, both as to its organization and method of operation, together with further objects and advantages thereof, will best be understood by reference to the following specification taken in connection with the accompanying drawings, in which:

Fig. 5 is a sectional side elevational view illustrating an alternative control unit embodying the principles of the present invention;

Fig. 6 is a bottom view of the unit of Fig. 5;

Fig. 7 is a schematic diagram illustrating the connection of the control unit of Fig. 1 in a typical street lighting circuit; and Fig. 8 is a similar circuit diagram illustrating the system connections of the control unit shown in Fig. 5.

Figure 1:
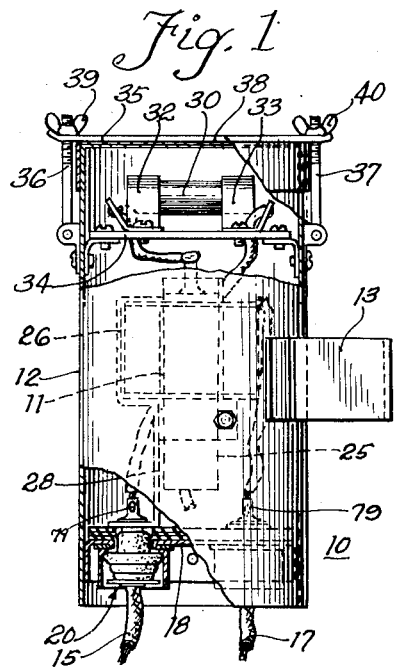
Fig. 1 is a side elevational view, partly in section, of a street lighting control unit embodying the principles of the present invention.

Referring now more particularly to the drawings, the street lighting control unit, indicated generally at 10 in Fig. 1, is employed remotely to control one or more street lamps in a street lighting circuit. In general, the control unit 10 comprises a mercury contact magnetic relay 11 which is positioned within a cylindrical steel container 12. The container 12 is provided with a mounting bracket 13 which is employed to mount the control unit 10 in an upright position. The relay 11 is supported from the bottom wall of the container 12 by means of a bracket 28. Electrical connection is made to the enclosed components of the control unit 10 by means of the conductors 14, 15, 16 and 17 which extend through the bottom wall 18 of the container. A lightning arrester unit indicated generally at 20 (Fig. 1) and described in more detail hereinafter, is associated with each of the conductors 14 through 17, inclusive, to protect the enclosed electrical components of the control unit 10 from voltage surges which may appear on any of these incoming conductors.

While the single pole magnetic relay 11 may be of any suitable type for energizing and deenergizing the desired street lighting circuit, I prefer to employ a magnetic relay of the mercury contact type in which the mercury contactor is enclosed in a stainless steel tube 25 with inert gas at 100 pounds' pressure. The armature of the mercury contactor is actuated by means of a control winding 26 which surrounds the stainless steel tube 25. A mercury contactor of this type provides several advantages over the conventional glass enclosed contactor in that the unit is rugged and unbreakable, permits the use of inert gas under high pressure and provides additional current carrying capacity. The space surrounding the relay 11 is filled with a suitable moisture-proof compound (not shown) so as to provide positive and permanent protection from all effects of weather.

To protect the relay 11 and the conductors associated therewith against faults on the lamp side of the relay, there is provided a cartridge type fuse 30 which is connected in series with the load terminal of the relay 11 to the load conductor 15 extending through the bottom wall 18 of the container. Electrical connection is made to the fuse 30 through the clip type terminal members 32 and 33 which are supported on a transverse supporting member 34 of insulating material which is positioned near the top of the container 12. To permit ready replacement of fuses, the top of the container comprises a smooth fitting cap member 35 which fits over the end of the container 12 and is held in place by means of the pivoted bolts 36 and 37. These bolts engage slots in the end portions of a transverse strip 38 secured to the cap 35, and are provided with thumb screws 39 and 40 for clamping the top 35 against the upper edge of the container 12.

The control unit 10 is connected remotely to control a street lighting circuit in the manner illustrated in Fig. 7. As shown, one side of a plurality of multiple connected street lamps 50 is connected to the neutral wire 51 of the power supply system. The line conductor 52 of the power supply system is connected to the other side of the lamps 50 through the control unit 10. Thus, the line conductor 52 is connected through the conductor 14, the mercury contactor of the relay 11, the fuse 30 and the load conductor 15 to the street lamps 50. As will be understood, the mercury contactor of the relay 11 comprises the stainless steel housing 25 which acts with the mercury pool 55 as one of the power circuit contact elements and is connected to the line conductor 14. The other power terminal comprises a central rod 56 which is insulated from the housing 25 and extends into the mercury 55. A cylindrical armature 57 of magnetic material is raised and lowered under the influence of the control winding 26 to change the level of the mercury pool 55 thereby making and breaking electrical contact between the power terminals of the contactor.

One side of the control winding 26 is connected through the conductor 16 to a control or pilot conductor 53 which is separate from the main street lighting power system including the conductors 51 and 52, and is arranged to supply a control voltage to one or more of the control units 10 in accordance with a predetermined time cycle of energization of the street lamps 50. The other side of the control winding 26 is connected through the conductor 17 to the neutral conductor 51 of the lighting system and is further connected to ground to insure connection of one side of the control winding 26 to ground potential. In this connection, it will be understood that the neutral wire 51 is normally grounded and the connection of the control winding to ground potential as well as the neutral wire 51 is merely an added precaution in the event that an open circuit occurs in this neutral conductor. It will further be understood that each of the incoming conductors 14, 15, 16 and 17 is protected by a lightning arrester unit which is associated with each of these conductors, all of the arrester units having as a common terminal the steel containr 12.

Considering now the operation of the control unit 10 in the above-described street lighting system and assuming that the mercury contactor of the relay 11 is normally closed, it will be evident that the control unit will supply current to the street lamps 50 over the above-described circuit including the mercury contactor and the fuse 30. In the event of a fault on the load conductor 15, the fuse 30 will open, thus protecting the relay 11 and the conductors associated therewith. When it is desired to turn off the lamps 50, a control or pilot current is supplied over the conductor 53 and through the control winding 26 of the unit 10. In this connection it will be noted that the pilot circuit requires but a single conductor 53, inasmuch as the other side of the control circuit utilizes the grounded neutral conductor 51 of the power supply system. When the control winding 26 is thus energized, the armature 57 of the mercury contactor is raised so as to decrease the level of the mercury pool 55 to a point well below the end of the power terminal 56 so that the power supply circuit is broken.

In the event that a voltage surge appears upon any of the incoming conductors 14 through 17, inclusive, the lightning arrester unit 20 associated therewith will spark over so as to conduct the surge to the container 12. If the container 12 is directly grounded through its mounting bracket, the surge is conducted over this path directly to ground. On the other hand, if the container 12 is ungrounded, a situation which normally obtains inasmuch as the control unit is adapted to be mounted on a standard insulating lightning arrester bracket, the arrester unit associated with the ground conductor 17 will spark over so as to conduct the voltage surge away from the enclosed components of the control unit 10, thus protecting the unit from damage by such surges.

Figure 4:
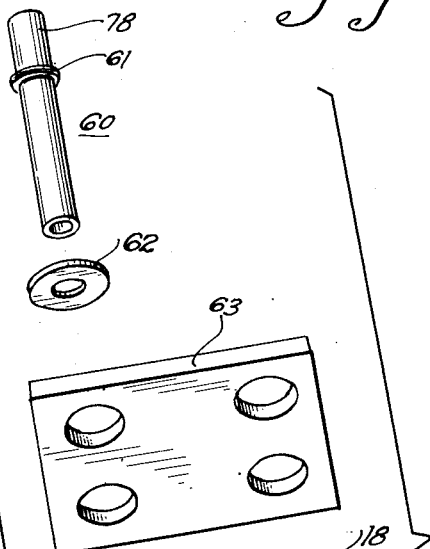
Fig. 4 is an exploded view of the component parts of the portion of the control unit shown in Fig. 3.
Figure 2:
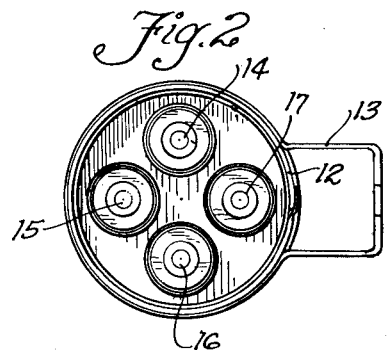
Fig. 2 is a bottom view of the unit of Fig. 1.
Figure 3:
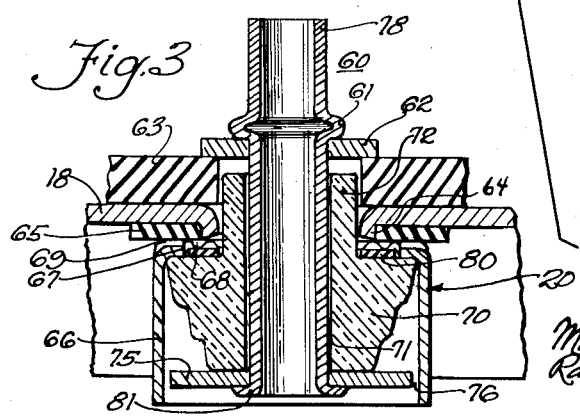
Fig. 3 is a sectional side elevational view on an enlarged scale of a portion of the control unit of Fig. 1.

Considering now more particularly the details of the lightning arrester units 20 associated with the incoming conductors of the control unit, reference is now made to Figs. 3 and 4 wherein one of the lightning arrester units 20 is shown on a larger scale. As shown, the arrester unit comprises a hollow, tubular, rivet-like, conductive, terminal member 60 which is provided with an outwardly extending flange portion 61 intermediate the length thereof. The flange 61 engages a washer 62 which is seated upon a terminal supporting and spacing member 63 of insulating material. The terminal supporting member 63 is carried on the inner surface of the bottom wall 18 of the container and the members 62, 63 and 18 are provided with aligned apertures through which the hollow terminal member 60 extends. The bottom member 18 is provided with an outwardly extending flange portion 64 adjacent the terminal aperture therein and there is provided an insulating spacer 65 which is positioned around the flange 64 and coaxial therewith. A cup-shaped electrode 66 is seated on the insulating spacer 65 and is provided with a relatively large opening in the bottom thereof so as to define an air gap 68 between the inner edge 67 of the electrode 66 and the adjacent edge of the flanged portion 64 of the container. The bottom surface of the electrode 66 is provided with radially extending corrugations 66a so as to define radially extending grooves or passageways 69 between the spacer 65 and the electrode 66. The passageways 69 serve as vent openings to permit the escape of gases produced in the above-described air gap 68, in the manner to be described in more detail hereinafter. An insulating bushing 70 is provided with a central bore 71 which is adapted to receive the terminal 60 and is further provided with a shank portion 72 of reduced diameter which extends through the aligned apertures in the container 18 and the terminal supporting member 63. The shank 72 thus acts to separate the conductive terminal 60 from the flange portion 64 of the container bottom wall 18. A disk electrode 75 is carried by the terminal 60 adjacent the head end of the bushing 70 and the periphery of the disk electrode 75 is spaced from the top rim portion of the cup-shaped electrode 66 so as to define an air gap 76 therebetween. The terminal 60 is adapted to surround the incoming conductor and the inner portion 78 of the terminal 60 is crimped, as illustrated at 79 (Fig. 1), to clamp a bared portion of the conductor between the sides of the upper portion 78 of the terminal member 60.

In order to facilitate extinguishment of an arc present in the air gap 68, there is provided a washer 80 which is positioned within the air gap 68 and is preferably formed of an insulating material of a type composed of a gas evolving or gas emitting material, such as horn fibre or the like, so as to produce an arc extinguishing gas when subjected to the heat and other action of the arc resulting from gap sparkover. The gas evolved by the washer 80 is expelled through the vent openings 69 so as to extinguish the arc present in the air gap 68.

In order to hold the component elements of the above-described double gap expulsion type lightning arrester in assembled relationship, the end portion of the terminal 60 is spun over to form a flange portion 81 so that the above-described elements are clamped between the flanges 61 and 81.

In considering the operation of the above-described double gap expulsion lightning arrester, it will be evident from the foregoing discussion that a breakdown path for voltage surges appearing on a conductor extending through the central bore of the terminal member 60 is established through the body of the terminal and the disk electrode 75, the air gap 76, the wall of the cup-shaped electrode 66, and the air gap 68 to the bottom wall of the container. If the surge is of sufficient magnitude to break down both the air gaps 76 and 68, a surge path is established between the incoming conductor and the bottom wall 18 of the container. As described above, if the container 12 is grounded, the surge will be conducted immediately to ground. However, if the container 12 is ungrounded, as, for example, if the bracket 13 is supported on an insulating member, the voltage surge will break down the series connected air gaps 68 and 76 of the lightning arrester unit associated with the ground conductor 17 of the control unit so that the surge is conveyed to ground without harming the relay 11 and its associated conductors.

When the arc is thus formed in the air gap 68, the washer 80 evolves an arc extinguishing gas when subjected to the heat and other action of the arc, which gas expands outwardly through the radially extending passageway 69, the passageways 69 acting as arc chutes to facilitate extinction of the arc. Further, the air gap 76 between the electrodes 66 and 75 prevents follow current flow over the described surge discharge path when the arc is extinguished at the gap 68.

To provide a street lighting control unit having a control circuit which may be connected into a relatively heavy current high voltage series lamp circuit, the alternative embodiment of the present invention shown in Figs. 5 and 6 may be employed. In the embodiment there shown, certain elements are identical with those embodied in the above-described control unit of Fig. 1, and these elements have been identified by reference numerals which correspond with those employed for the same elements in the unit of Fig. 1. In order that the control unit may itself be controlled by a series controlling circuit of relatively high current capacity, the unit shown in Fig. 5 is provided with a current transformer indicated generally at 90. The transformer 90 is provided with a relatively high current primary coil 91 which is connected to the conductors 92 and 93 of a series control circuit. Connection between the primary 91 and the conductors 92 and 93 may be made by any convenient means such as, for example, the solderless type connectors 94 which are deformed to secure the ends of the conductors 92 and 93 in electrical contact with the lead wires from the primary winding 91. The secondary winding 95 of the current transformer 90 is connected through the lead wires 96 and 97 to the control winding 26 of the magnetic relay 11. The transformer 90 is supported from the top wall of the container 12 by means of the brackets 100 and 101. These brackets depend from the top wall of the container and are provided with clamping members 102 and 103 which are in engagement with the end portions of the core of the transformer 90 and are positioned above the upper end of the control relay 11.

In order to provide a moisture-proof entrance for the incoming series-controlled conductors 92 and 93, which is sufficiently insulated from the housing to withstand the relatively high voltage of a series lamp circuit, there is provided a two-piece porcelain entrance bushing comprising an upper skirted porcelain bushing member 105 and a threaded flanged porcelain bushing member 106. The bushing member 106 threads into a flange 107 in the top wall of the container and provides a seat for the upper bushing member 105. The upper bushing member 105 is provided with a central well 110 which is adapted to receive the insulated ends of the conductors 92 and 93, the space within the well not occupied by the conductors being filled with a suitable moisture-proof sealing compound 111. The bare conductors 92 and 93 extend through passageways 112 and 113 in the bushing member 105 into the interior of the control unit wherein they are connected to the primary winding of the transformer 90 in the manner described above.

To protect the control unit against surges on the incoming conductors 92 and 93 of the series control circuit, means are provided for conducting voltage surges appearing on these conductors to ground potential. More specifically, there is associated with each of the conductors 92 and 93 a conductive clip 115 which is positioned within the well 110 adjacent the conductor. One end of the clip 115 is apertured to receive the bare conductor and to make electrical contact therewith. The other end 116 of each clip 115 extends out of the well 110 to act as one air gap electrode. The other electrode, common to both the clips 115, comprises a conductive ground ring 118 which is positioned between the bushing members 105 and 106 and is provided with a rim portion 119 which extends partially around the bottom skirt of the bushing member 105. Preferably, the inner edge of the ground ring 118 is provided with a curved rim portion 120 which extends around the adjacent edge of the bushing member 106 so that the ground ring 118 holds the bushing members 105 and 106 in assembled relationship as well as acting as an air gap electrode. The inner rim portion 120 of the ground ring is connected internally of the control unit through the conductor 121 to the terminal member 122 of a double gap expulsion type lightning arrester unit 20 similar to those described in detail in connection with Figs. 3 and 4. From the lightning arrester terminal 122, the ground lead extends externally of the control unit through the ground conductor 125 to the neutral wire of the street lighting power system and also to ground. The line and load terminals of the relay 11, which are connected to the line and load conductors 14 and 15, are also provided with lightning arrester units similar to those described in connection with the control unit of Fig. 1.

In considering the operation of the above-described series to multiple street lighting control unit reference may now be had to Fig. 8 wherein the circuit diagram of a typical installation of the control unit is shown. Thus, for example, the series to multiple type street lighting control unit may be employed to control an auxiliary bank of street lamps 130 in accordance with the energization of a primary string of series connected street lamps 135. The series lamp circuit 135, for example, may be energized directly from a substation through the high voltage distribution transformer 136. When the substation circuit 135 is energized, current flowing through the primary winding 91 of the current transformer 90 produces sufficient flux to attract the armature 57 and move the same downwardly into the pool of mercury 55 so as to raise the level of the pool 55 well above the lower end of the power terminal 56. In this connection it will be understood that while the mercury contact relay employed in the series to multiple type control unit shown in Fig. 8 is of the normally open type wherein the armature 57 is light enough to float on the mercury pool when the control winding 26 is deenergized, a normally closed type of relay may equally well be employed if particular circuit arrangements require the same. When the control winding 26 is energized, a power circuit is completed between the line conductor 14 and the load conductor 15 thereby supplying power from the line 52 to the series of multiple connected lamps 130. In this connection, it will be understood that the series to multiple type control unit may be employed in a wide variety of lighting circuits. For example, a control unit of this type may be used as a master control circuit and the line and load conductors 14 and 15 thereof may be utilized to set up an auxiliary pilot circuit which may, in turn, supply power over a control conductor 53 to a plurality of auxiliary control units, of the type shown in Fig. 1, and associated with a plurality of groups of multiple connected street lamps.

In considering the operation of the surge protecting facilities of the series to multiple type unit shown in Figs. 5, 6, and 8, it will be understood that the conductors 14, 15 and 125 are protected against lightning surges by means of the double gap expulsion type lightning arrester 20 associated with each of these conductors, as described in detail in connection with the control unit of Fig. 1. In the event that a lightning surge occurs on either of the conductors 92 and 93 which extend through the porcelain entrance bushing 105, it will be understood that this voltage surge, if of sufficient magnitude, will form an arc between the conductive electrodes 116 and 119, whereupon the surge is conducted through the ground conductors 121 and 125 to ground.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. A street lighting control system, comprising a first group of series connected lamps energized in accordance with a predetermined timing cycle, a plurality of groups of multiple connected street lamps, a first street lighting control unit connected in series with said first group of lamps and actuated in accordance with said predetermined timing cycle, a pilot circuit arranged to be controlled by said first control unit, an auxiliary control unit associated with each of said groups of multiple connected street lamps, and means for controlling said auxiliary control units in unison from said pilot circuit.

2. A street lighting control system, comprising a first group of series connected street lamps energized in accordance with a predetermined timing cycle, a plurality of groups of multiple connected street lamps, a master street lighting control unit including a relay, control means connected in series with said first group of lamps for actuating said relay in accordance with said predetermined timing cycle, an auxiliary street lighting control unit associated with each of said groups of multiple connected street lamps, each of said auxiliary units including a control circuit adapted to energize the group of multiple connected set of street lamps associated therewith, and means controlled by said relay for controlling said auxiliary units in unison thereby to energize said plurality of groups of street lamps in accordance with said predetermined timing cycle.

3. In a street lighting system of the type having a first group of series connected street lamps energized in accordance with a predetermined timing cycle, a control unit for controlling an auxiliary group of multiple connected street lamps in accordance with said timing cycle, comprising a current transformer having the primary winding thereof connected in series with said first group of lamps, a magnetic relay having a control winding connected to the secondary winding of said transformer and having a pair of power contacts which are closed when said relay is energized, and means including said power contacts for supplying power to said auxiliary group of street lamps when said relay is energized.

4. In a street lighting system, the combination of, a first group of series connected street lamps energized in accordance with a predetermined timing cycle, an auxiliary group of multiple connected street lamps, and means for energizing said auxiliary group of lamps in accordance with said predetermined timing cycle, said last named means comprising a current transformer, means connecting the primary winding of said transformer in series with said first group of lamps, a relay including a pair of normally open power contacts, means including the secondary winding of said transformer for closing said contacts during periods when said first group of lamps is energized, and means for supplying power to said auxiliary group of lamps when said contacts are closed.

5. In a street lighting system, the combination of, a first group of series connected street lamps energized in accordance with a predetermined timing cycle, an auxiliary group of multiple connected street lamps, and means for energizing said auxiliary group of lamps in accordance with said predetermined timing cycle, said last named means comprising a current transformer provided with primary and secondary windings, means connecting the primary winding of said transformer in series with said first group of lamps, and switching means including a relay energized by the secondary winding of said transformer during periods when said first group of lamps are energized for selectively controlling the energization of said auxiliary group of lamps.

6. In a street lighting system, the combination of, a first group of series connected street lamps energized in accordance with a predetermined timing cycle, a common circuit including and interconnecting an auxiliary group of street lamps, a current transformer provided with a primary winding connected in series with said first group of lamps and including a secondary winding, switching means including a relay energized by said secondary winding of said transformer during periods when said first group of lamps is energized, and means controlled by said switching means for selectively supplying power over said common circuit to said auxiliary group of lamps.

EDWARD H. YONKERS, Jr.

References Cited in the file of this patent

UNITED STATES PATENTS

| Number | Name | Date |
|---|---|---|
| 634,932 | Wirt | Oct. 17, 1899 |
| 1,766,738 | Austin | June 24, 1930 |
| 2,070,740 | Larson | Feb. 16, 1937 |
| 2,224,873 | Larson | Dec. 17, 1940 |
| 2,304,334 | Boucher | Dec. 8, 1942 |
| 2,444,745 | Mosley | July 6, 1948 |
| 2,508,991 | Butler | May 23, 1950 |